United States Patent
Lester et al.

(10) Patent No.: US 10,969,969 B2
(45) Date of Patent: Apr. 6, 2021

(54) USE OF RECOVERY BEHAVIOR FOR PROGNOSTICATING AND IN-SITU REPAIR OF DATA STORAGE DEVICES

(71) Applicant: Western Digital Technologies, Inc., San Jose, CA (US)

(72) Inventors: Robert Lester, Colorado Springs, CO (US); Timothy Lieber, Colorado Springs, CO (US); Austin Striegel, Rochester, MN (US); Evan Richardson, Rochester, MN (US); Donald Penza, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/453,368

(22) Filed: Jun. 26, 2019

(65) Prior Publication Data

US 2020/0409569 A1 Dec. 31, 2020

(51) Int. Cl.
*G06F 11/00* (2006.01)
*G06F 11/07* (2006.01)
*G06F 3/06* (2006.01)

(52) U.S. Cl.
CPC .......... *G06F 3/0617* (2013.01); *G06F 3/0653* (2013.01); *G06F 3/0686* (2013.01)

(58) Field of Classification Search
CPC ............................ G06F 11/00; G06F 11/0709
See application file for complete search history.

(56) References Cited

U.S. PATENT DOCUMENTS

| 6,192,499 | B1 | 2/2001 | Yang |
| 6,408,406 | B1 | 6/2002 | Parris |
| 7,765,437 | B2 | 7/2010 | Gittins et al. |

(Continued)

FOREIGN PATENT DOCUMENTS

| CN | 101324859 A | 12/2008 |
| CN | 104714869 B | 3/2015 |

(Continued)

OTHER PUBLICATIONS

International Search Report and Written Opinion for counterpart PCT/US2019/068627, dated Mar. 17, 2020, 12 pages, ILPO ISA/IL.

(Continued)

*Primary Examiner* — David E Martinez
(74) *Attorney, Agent, or Firm* — John D. Henkhaus

(57) ABSTRACT

An approach to identifying problematic data storage devices, such as hard disk drives (HDDs), in a data storage system involves retrieving and evaluating a respective recovery log, such as a media error section of a device status log, from each of multiple HDDs. Based on each recovery log, a value for a Full Recoveries Per Hour (FRPH) metric is determined for each read-write head of each respective HDD. Generally, the FRPH metric characterizes the amount of time a head has spent performing recovery operations. In response to a particular head FRPH reaching a pre-determined threshold value, an in-situ repair can be determined for the HDD in which the head operates. Similarly, in the context of solid-state drives (SSDs), a latency metric is determinable based on time spent waiting on resolving input/output (IO) request collisions, on which an in-situ repair can be based.

21 Claims, 5 Drawing Sheets

(56) References Cited

U.S. PATENT DOCUMENTS

| | | |
|---|---|---|
| 8,085,488 B2 | 12/2011 | Feliss et al. |
| 9,262,429 B2 | 2/2016 | Roomp et al. |
| 9,729,534 B2 | 8/2017 | Zhang et al. |
| 2002/0036850 A1 | 3/2002 | Lenny et al. |
| 2002/0126410 A1 | 9/2002 | Doi et al. |
| 2003/0031106 A1 | 2/2003 | Ozaki |
| 2003/0163759 A1 | 8/2003 | Arakawa |
| 2006/0253767 A1* | 11/2006 | Winarski ............ G06F 11/1088 714/755 |
| 2010/0275057 A1* | 10/2010 | Durica ................ G06F 11/2094 714/6.32 |
| 2017/0123738 A1 | 5/2017 | Kawabat et al. |

FOREIGN PATENT DOCUMENTS

| | | |
|---|---|---|
| CN | 105260279 A | 1/2016 |
| JP | H10320131 A | 12/1998 |
| JP | 2016146071 A | 8/2016 |

OTHER PUBLICATIONS

HDD Regenerator for Windows: review, submitted on Mar. 21, 2018, 2 pages, downloaded from https://howtorecover.me/hdd-regenerator-windows-review-download.

Paris et al., Self-Repairing Disk Arrays, 6 pages, Cornell University, arXiv.org, downloaded from https://arxiv.org/ftp/arxiv/papers/1501/1501.00513.pdf.

* cited by examiner

USE OF RECOVERY BEHAVIOR FOR PROGNOSTICATING AND IN-SITU REPAIR OF DATA STORAGE DEVICES

FIELD OF EMBODIMENTS

Embodiments of the invention may relate generally to data storage systems and, more particularly, to approaches to prognosticating and in-situ repair of data storage devices.

BACKGROUND

There is a commercial demand for high-capacity digital data storage systems, in which multiple data storage devices (DSDs) are housed in a common enclosure. Data storage systems often include large enclosures that house multiple shelves on which rows of DSDs are mounted. A typical approach with data storage systems is to decommission, or stop using, DSDs that misbehave or fail in the field. Such DSDs are then often swapped for replacement DSDs by technicians at the internal lab or customer deployment site. Failed drives are either destroyed by the customer or returned to the manufacturer for failure analysis.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to prognosticating of and in-situ repair of data storage devices are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Data Storage System

Figure 2:
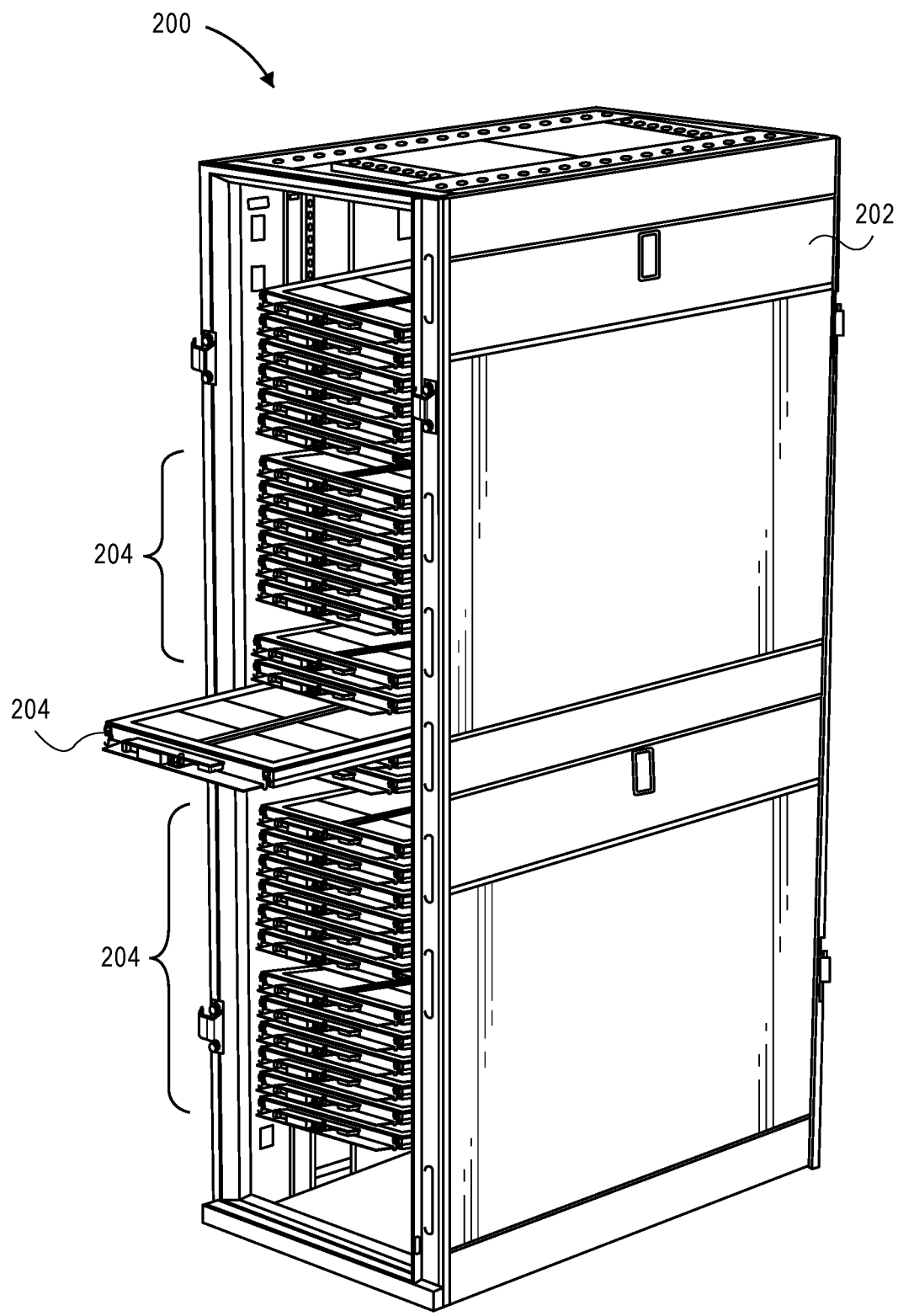
FIG. 2 is a perspective view illustrating a data storage system, according to an embodiment.

There is a commercial demand for high-capacity digital data storage systems, in which multiple data storage devices (DSDs), such as hard disk drives (HDDs) and/or solid-state drives (SSDs) are housed in a common enclosure. Data storage systems often include large enclosures that house multiple shelves on which rows of DSDs are mounted. FIG. 2 is a perspective view illustrating an example data storage system, according to embodiments. A data storage system 200 may comprise a system enclosure 202 (or "rack 202"), in which multiple data storage system trays 204 are housed. Each tray 204 may be placed or slid into a corresponding slot within the rack 202, for example. Rack 202 further houses a system controller, and may further house switches, storage server(s), application server(s), a power supply, cooling fans, etc.

Figure 3:
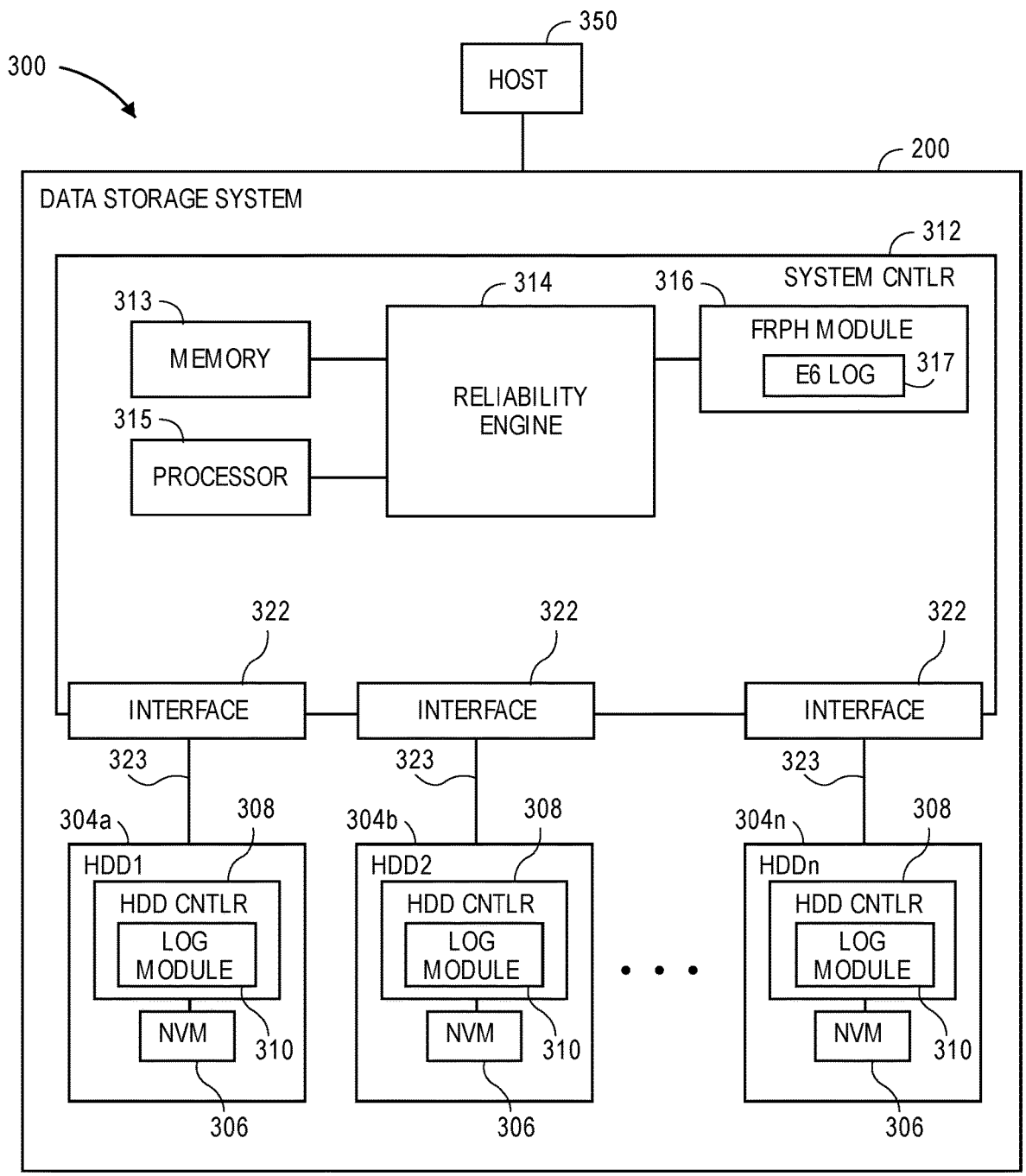
FIG. 3 is a block diagram illustrating a data storage system architecture, according to an embodiment.

FIG. 3 is a block diagram illustrating a data storage system architecture, according to an embodiment. Example architecture 300 illustrates a data storage system 200 that comprises multiple hard disk drives (HDDs) 304a (HDD1), 304b (HDD2), and 304n (HDDn), where n represents an arbitrary number of HDDs (and/or SSDs) that may vary from implementation to implementation. Each HDD 304a-304n is communicative with and under the control of a data storage system controller 312, via a communication interface 322 according to a corresponding communication protocol 323. Each HDD 304a-304n includes corresponding non-volatile memory (NVM) 306 (e.g., typically in the form of spinning magnetic disk media in the case of HDDs) controlled by a respective HDD controller 308, which includes a log module 310. Each log module 310 (which may be, for example, constituent to a corresponding system on chip (SoC), such as part of the data channel circuitry or the hard disk controller circuitry, as depicted, in the context of an HDD) is capable of logging actions taken by the HDD controller 308, such as logging of read, write, and seek errors, associated recovery actions, and other near-term and long-term HDD status information. The system controller 312 of data storage system 200 includes memory 313, a processor 315, and a reliability engine 314 and an associated FRPH (Full Recoveries Per Hour) module 316, which collectively represent procedural functionality involving prognosticating of and in-situ repair of the HDDs 304a-304n, as described in more detail elsewhere herein.

Processing, functions, procedures, actions, method steps, and the like, that are described herein as being performed or performable by system controller 312, or by a HDD 304a-304n, may include enactment by execution of one or more sequences of instructions stored in one or more memory units and which, when executed by one or more processors, cause such performance. System controller 312 may be embodied in any form of and/or combination of software, hardware, and firmware. For example, and according to an embodiment, the system controller 312 comprises an application-specific integrated circuit (ASIC) comprising at least one memory unit for storing such instructions (such as firmware, for a non-limiting example) and at least one processor for executing such instructions, enabling prognosticating regarding potentially problematic HDDs (e.g., "silent" failing drives, which might be struggling internally to complete data transactions but have not yet failed publicly) of the plurality of HDDs 304a-304n, and managing, controlling, facilitating in-situ repair actions corresponding to failed and failing HDDs.

The data storage system 200 may be communicatively coupled with a host 350, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 350 generally represents a client of the data storage system 200, and has the capability to make read and write requests (input/output or "IO") to the data storage system 200. Note that the system controller 312 may also be referred to as a "host" because the term is often generally used in reference to any device that makes IO calls to a data storage device or an array of devices, such as HDDs 304a-304n.

Introduction

If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Some data storage systems implement diagnostic and in-situ (e.g., "in place" or "in position") repair procedures. This means that system HDDs that have failed during operation in the field are diagnosed and fixed in the field to the extent possible, and if they cannot be fixed they are retired in place rather than replaced. Preferably, in-situ repairs entail automated or semi-automated procedures, while the HDD of interest remains in the system enclosure. Many HDD repairs do not result in any loss of capacity or performance. An HDD may be repaired in a way that still allows continued use by system software, albeit with reduced capacity or performance. An HDD that cannot be repaired may be allowed to fail in place within the system, such as in scenarios in which the system was shipped with over-provisioned storage capacity that permits availability of the full, specified storage capacity despite a number of drive failures. In-situ repair can eliminate the cost of scheduling service technicians to replace drives that fail in the field, as well as the cost of those replacement drives. Additionally, in-situ repair can reduce the AFR (annual failure rate) of storage devices, and will likely eliminate the ARR (annual return rate) as future product releases adopt a "fail-in-place" model.

Implementations of in-situ repair in HDDs can minimize the amount of over-provisioning necessary in a data storage system to be able to offer a lifetime hardware warranty. As mentioned, some storage systems (and/or storage system operating system software) may be able to continue using many HDDs after they fail. Analysis of failed drives shows that many HDDs that fail in the field can be restored to full or partial usage with relatively uncomplicated techniques.

Reliability Engine

With reference to FIG. 3, according to an embodiment, a software component referred to as the reliability engine 314 is responsible for performing or managing HDD diagnostic, prognostication, and repair operations. With respect to diagnosis, when the system (e.g., system controller 312 of data storage system 200) detects a problem with an HDD 304a-304n of the data storage system 200, the system invokes the reliability engine 314 and passes information that describes what issue the system had with that HDD. Typically, the reliability engine 314 may enter a diagnostic state with respect to that HDD and analyze the HDD to identify the root cause of the issue. With respect to repair, once the root cause of the issue has been identified, reliability engine 314 notifies system controller 312 logic of the recommended repair action, which the system controller 312 can schedule according to the level of urgency based on system events (e.g., code upload, impending shutdown/reboot) and the level of disk redundancy within the system. Once the system controller 312 requests a repair, the HDD is typically taken offline and the reliability engine 314 conducts the repair (which may take anywhere from a few seconds to a few days). At the conclusion of the repair and post-repair diagnostics, the HDD may either be restored to full use, restored to use with reduced capacity and/or performance, or the HDD may be retired from the system.

According to embodiments, with respect to prognosticating, the reliability engine 314 also periodically monitors the health of each HDD while it is online and being used by the system. This may be done by reading and analyzing a time-limited subset of the HDD's internal E6 log(s) 317, such as in conjunction with or with assistance from the FRPH module 316 as described in more detail elsewhere herein. Thus, reliability engine 314 can proactively detect, for example, a latency issue or an error rate issue in an HDD that is impacting the host visible performance, but is not serious enough for the system to fail the HDD. For example, a HDD that consistently enters high DRP (Data Recovery Procedure) levels when accessing a specific head or region of media will often exhibit higher IO completion latency than its peers. In some storage systems' erasure coded or RAID-based system, host visible latency is often bounded by the performance of the slowest HDD in the data set. The reliability engine 314 can asynchronously notify system controller 312 logic of a recommended repair operation for that HDD. Once the system allows reliability engine 314 to proceed with a repair to remove the high latency head/surface, the host visible latency degradation is resolved.

Hard Disk Drive Prognostication Tool: Full Recoveries Per Hour

Figure 4:
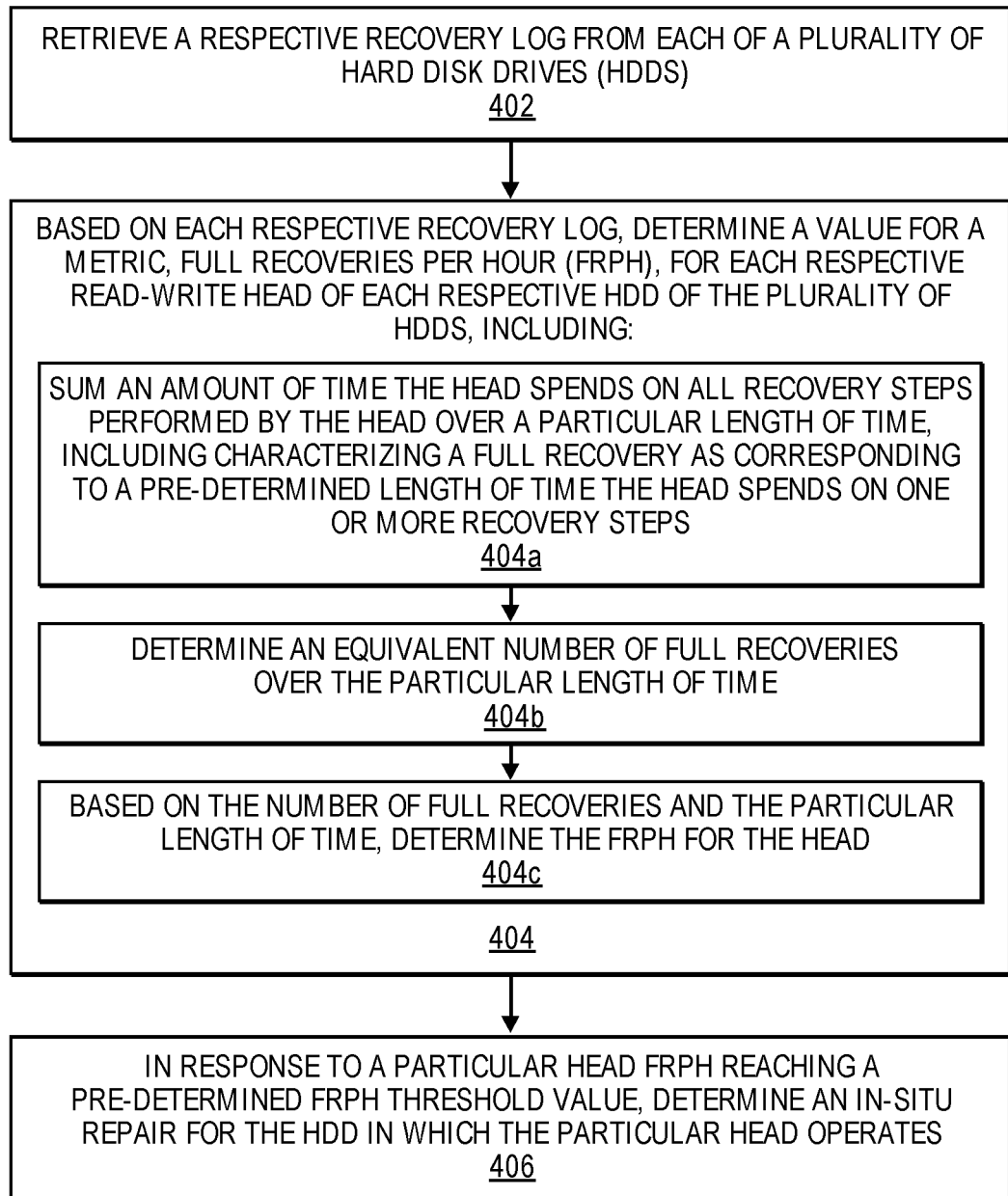
FIG. 4 is a flow diagram illustrating a method of identifying problematic hard disk drives, according to an embodiment.

FIG. 4 is a flow diagram illustrating a method of identifying problematic hard disk drives, according to an embodiment. The process or procedure of FIG. 4 may be implemented for execution as one or more sequences of instructions stored in one or more memory units and which, when executed by one or more processors, cause performance of the process. For example, the sequences of instructions (e.g., reliability engine 314 embodied in firmware of system controller 312 of FIG. 3) stored in one or more memory units (e.g., ROM inherent to firmware) and which, when executed by one or more processors (e.g., processor 315 of system controller 312 of FIG. 1), cause performance of the process illustrated in FIG. 4.

Furthermore, a comparable method of identifying problematic solid-state drives (SSDs), modified appropriately in view of the different technologies underlying a hard disk drive and a solid-state drive, is contemplated. For example, with an HDD, a main reason that DRP steps add host-visible latency is because of the rotational latency of having to wait for additional revolutions of the media, to retry the operation. By contrast, there is no rotational latency in the context of an SSD, thus, a key contributor to host-visible latency are scenarios in which host IO has to wait for other activities the SSD is performing, such as host IO requests colliding with background tasks (e.g., garbage collection, cell refresh, read disturb, etc.), host IO requests colliding with other host IO requests, and increased latency caused by non-volatile memory components that take longer to program/erase operations because they are exhibiting degradation due to age and/or wear. Hence, a functionally equivalent metric to FRPH, but for SSDs, can be used to quantify the variability of latency (and, likewise, variability of QoS (Quality of Service)) in storage system SSDs.

At block 402, a respective recovery log is retrieved from each of a plurality of hard disk drives. For example, an E6 log 317 (FIG. 3) is retrieved by system controller 312 (FIG. 3) of data storage system 200 (FIGS. 2, 3) from the log module 310 (FIG. 3) of one or more of the plurality of HDDs 304a-304n (FIG. 3). An E6 log 317 refers to an implementation of a binary file used to snapshot the state of an HDD. An E6 log 317 contains a large number (tens) of sub-sections, including a Media Error Log, and is typically in the size range (order of magnitude) of 10 MB to 100 MB, depending on which "modes" (groups of sections) are fetched. There is also an incremental E6 log capability, which only fetches state that is "new", i.e., since the most recent full or incremental fetch. Incremental E6 logs may be as small as a few MB but could be up to the size of a full E6 log 317. The sections of an E6 log 317 have various themes/purposes, some are global fixed size "life of the drive" state, and some grow over time as more drive activities accumulate. Some of the section's data elements are retained for the life of the drive, and some wrap, with the HDD autonomously deleting older state to avoid exceeding a size boundary ceiling. According to an embodiment, the Media Error Log portion of the E6 log 317 is used hereafter in this method to compute the following FRPH (Full Recoveries Per Hour) metric, and is referred to herein functionally as a "recovery log" because this particular portion or section of the E6 log 317 records the data recovery steps (e.g., seek recovery, read recovery, write recovery) performed by each read-write head within a corresponding HDD.

At block 404, based on each respective recovery log, a value for the metric referred to as FRPH is determined for each respective read-write head of each respective HDD of the plurality of HDDs. For example, the FRPH value is computed as described hereafter for each read-write head (e.g., read-write head 110a of FIG. 1) of each of the one or more plurality of HDDs 304a-304n, based on the recovery logs retrieved at block 402. A DRP or recovery "step" is an action that the HDD dynamically invokes to recover data from a sector or sectors that was not readable following the execution of prior steps. For example, there may be hundreds of possible DRP steps available to a HDD/head, which may be more generally classified in one of a category for read, write, and seek recovery steps, where higher step numbers represent more involved recovery algorithms and therefore take longer to execute than lower numbered DRP steps. According to an embodiment, a "full recovery" is execution of all possible DRP steps. If a full recovery is not successful the host receives a hard error indicating that the data could not be transferred.

At block 404a, the amount of time the head spends on all recovery steps performed by the head are summed over a particular length of time, i.e., the evaluation period. For example, the relevant recovery log is parsed and the severity (time spent per each "type" or "level" of recovery step) of all the recovery steps performed by each HDD head (e.g., from the HDD Media Error Log section of the E6 log 317) are summed, for a non-limiting example, over the last 300 hours of operating time. According to an embodiment, the evaluation period is a configurable parameter allowing for an arbitrary time window over which to analyze the recovery steps.

Conceptually, a full recovery means all the recovery steps for a recovery event have been run, with the more recovery steps needed indicating a relatively more severe issue and the more time the data recovery would take. However, according to an embodiment, for algorithmic purposes a "full recovery" is characterized as corresponding to a pre-determined length of time the head spends on one or more recovery steps. According to an embodiment, one full recovery is established as approximately 2.5 seconds of real time being spent by a head on one or more recovery steps. However, how a full recovery is characterized for algorithmic purposes may vary from implementation to implementation. Hence, for every pre-determined amount of time (e.g., 2.5 seconds of real time) the head spends on recovery steps a "full recovery" is counted. Regarding the severity of recovery steps, as discussed in reference to an exemplary system, there are hundreds of possible DRP recovery steps, with higher step numbers representing more involved, complex recovery algorithms which, therefore, take longer to execute than lower numbered DRP steps. Furthermore, the recovery steps are classified into groups of similar complexity and, therefore, similar execution time. For example, one thousand "step 4" recovery steps may be temporally equivalent to one hundred "step 8" recovery steps.

As such, at block 404b, an equivalent number of full recoveries over the particular length of time is determined. With reference to the foregoing examples, the number of 2.5-second units of time that a head spends on recovery steps over a 300-hour evaluation period establishes the number of full recoveries for that head. Then, at block 404c, based on the number of full recoveries accrued and the particular length of time evaluated, the FRPH value is determined for the head, which represents how much DRP recovery time (e.g., in units of the time a maximum length full recovery takes) each head spent, per hour, on average, averaged over the last 300 hours, for example. Thus, at block 404, blocks 404a-404c are iterated for each head from each HDD 304a-304n under evaluation. Furthermore, FRPH is computed by examining the recovery log to identify each IO that required any recovery steps, and then adding up an estimate of the total amount of time to perform all of the recovery steps used on behalf of that IO, and the FRPH metric is computed separately for each of the heads in the HDD.

Computation of the FRPH metric values at block 404 may be implemented by analyzing the recovery log over the evaluation period, summing the total number of times that each head spent in each of the hundreds of DRP recovery steps, which would effectively yield a histogram recording the number of invocations of each recovery step/level, per head. For each recovery step, a constant time value that estimates how long that particular recovery step takes to perform can be multiplied by the respective invocations for that recovery step, which would yield the total amount of time spent in any recovery step, per head. The total amount of time spent in all recovery steps can be divided by the evaluation period (e.g., 300 hours), which would yield the average amount of time per hour spent in any recovery step, per head. The average time per hour spent in all recovery steps can be normalized by dividing the time established for a full recovery (e.g., the equivalent of a "full recovery" of 2.5 seconds), which would yield the FRPH value normalized to the evaluation period, where a FRPH value of one would mean that on average, every hour (e.g., over the last 300 hours evaluation period), the head spent the time it takes to perform one full recovery in a recovery operational mode.

At block 406, in response to a particular head FRPH reaching a pre-determined FRPH threshold value, an in-situ repair is determined for the HDD in which the particular head operates. For example, and according to an embodiment, an HDD having one or more heads having an FRPH value of one (e.g., the threshold value) or greater over the particular length of time (e.g., the 300 hour evaluation period) is identified as a problematic HDD, i.e., likely to be "silently" failing. Furthermore, the FRPH metric can be made available to clients to query, such as via a RESTful API (representational state transfer application program interface), whereby the client would decide if the FRPH value warrants mitigating action and, if so, would need to initiate such action themselves.

According to an embodiment, if any HDD 304a-304n has one or more heads having an FRPH greater than or equal to one, then the head having the highest FRPH in this problematic HDD is identified, and a "head depop" (head depopulation) is performed on that head, i.e., the head is classified (e.g., to the system controller 312 and/or to the HDD controller 308) as ineligible for use in further IO operations, effectively disabled from further use/operation. Alternatively, according to an embodiment, an otherwise troublesome HDD may be reformatted to its current capacity. For example, in a scenario in which one or more heads have already been depopped in a prior repair operation and the decision was made not to depop another head at this time, then the HDD may be reformatted to its current capacity, taking into account the reduced capacity corresponding to the heads that were previously depopped. Furthermore, and according to an embodiment, because it can be ascertained from the Media Error Log how many and which problematic regions of media contributed to the FRPH value, another repair option involves forcibly sparing out the troublesome region(s) of media (e.g., marking the region(s) unavailable for further IOs) rather than undertaking a longer and more complex reformat or depop repair.

Intelligent System-Level Reliability Schemes

Historical storage systems may comprise storage devices that have autonomous, independently designed diagnostic and device reliability schemes, which can lead to reduced efficiency and effectiveness in the overall storage system. By contrast, an expanded holistic view of the operational functionality at and among different storage devices as distributed throughout a storage system may lead to a more efficient and more reliable overall system. The data storage devices, such as HDDs 304a-304n (FIG. 3) that are constituent to a data storage system 200 (FIGS. 2 and 3) can be considered sensitive sensors of factors that may affect the data integrity and reliability associated with each DSD, such as temperature, airflow, vibration, and the like in the context of HDDs, and age, storage cycles, and the like in the context of SSDs. Furthermore, HDDs 304a-304n may be sources of information regarding position error signals (PES) and the factors contributing thereto, DRP recovery operations, and the like, corresponding to a specific head or region of media. Hence, data integrity and recovery information that each DSD may be internally privy to, and combinations thereof, when shared with a system controller such as controller 312 (FIG. 3), can provide an inexpensive but valuable expanded vision of the symptoms of data degradation at the device level, for use as an informed and efficient diagnostic, prognostic, and repair controlling point at the system level. There may also be additional information about the DSDs available at the system level, e.g., available to the system controller 312, that can contribute to and/or be combined to contribute to intelligent, predictive decision-making at the system level. For example, in the context of HDDs, the system controller may be made privy to information such as the storage device form factor, the number of disks (and/or actuators), the disks' RPM (revolution per minute), and other common variations among HDD models, and possibly as well as the location of each storage device within a particular shelf and within the system rack (e.g., rack 202 of FIG. 2), relative proximity to fans, fan speed, relative proximity to heat sources, and other factors external to each device itself. Note that the HDDs 304a-304n, as well as the system controller 312, may be programmed to "learn" over time. Thus, factors that may affect the data reliability associated with each HDD may not be static, i.e., such factors (and repair decisions based thereon) may be dynamic over time.

The closed loop nature of HDD monitoring-diagnosing/prognosticating-repairing that is described herein is capable of continuously monitoring HDD logs, computing metrics showing behavior of that one HDD, and then comparing the metrics of each HDD to those of its peers to make a "pass/fail" determination. Note that each HDD's event logs are used to compute each HDD's metrics, where each HDD only has awareness of itself. Here, the system can see many HDDs worth of metrics and compare the metrics of one HDD to the metrics of the HDD's peers, where the definition of peer can be variable, e.g., by similar model type, firmware revision, and even by the HDD's use case within the rack. Similarly, computation of each FRPH metric only evaluates the health of the heads on one drive. However, the diagnostic host can set the threshold for what value of the FRPH metric constitutes a pass or a fail by taking into account how exceptional each drive's FRPH metric score is with respect to the larger ecosystem visible to the diagnostic host. For example and according to an embodiment, the pass/fail threshold (i.e., the FRPH threshold) can be set to a value that equals two or three standard deviations above the mean (or median) FRPH score of the rest of the deployment.

Hard Disk Drive Configuration

As discussed, embodiments may be used in the context of a data storage system in which multiple data storage devices (DSDs) such as HDDs are employed. Thus, in accordance with an embodiment, a plan view illustrating an HDD 100 is shown in FIG. 1A to illustrate exemplary operating components.

Figure 1A:
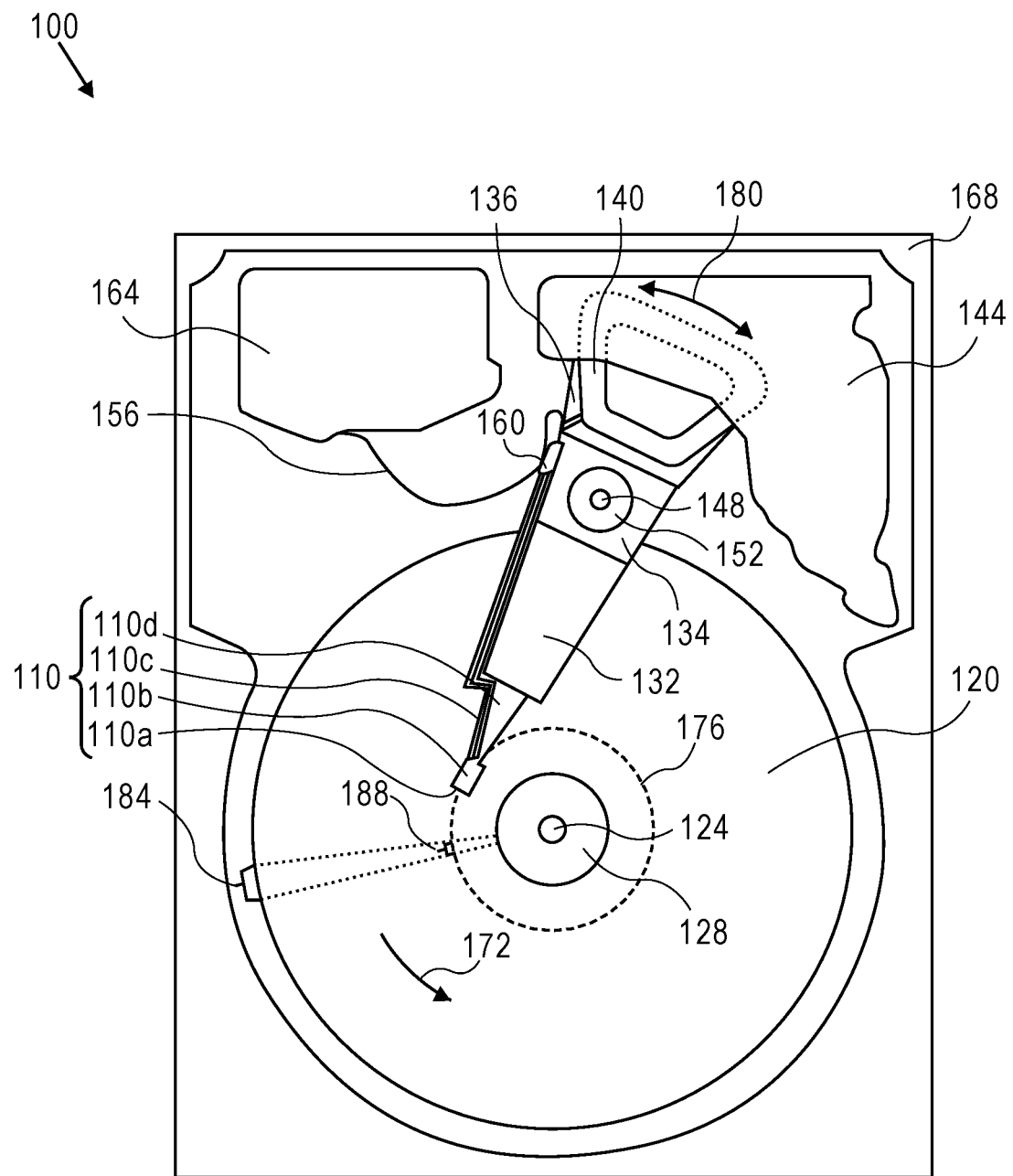
FIG. 1A is a plan view illustrating a hard disk drive (HDD), according to an embodiment.

FIG. 1A illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Solid State Drive Configuration

Figure 1B:
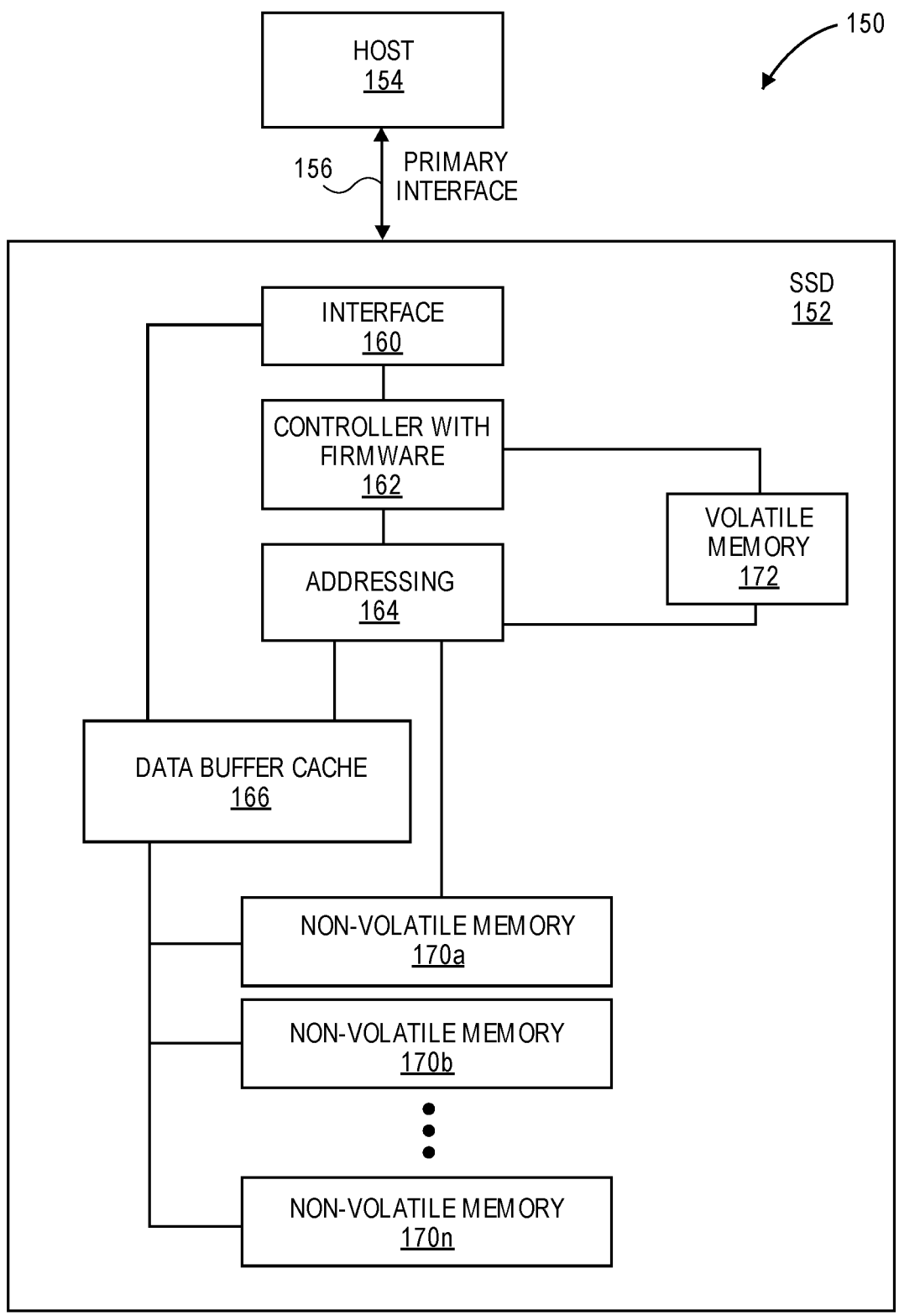
FIG. 1B is a block diagram illustrating a solid-state drive (SSD), according to an embodiment.

As discussed, embodiments may be used in the context of a data storage system in which multiple data storage devices (DSDs) such as SSDs are employed. Thus, FIG. 1B is a block diagram illustrating an example operating context with which embodiments of the invention may be implemented. FIG. 1B illustrates a generic SSD architecture 150, with an SSD 152 communicatively coupled with a host 154 through a primary communication interface 156. Embodiments are not limited to a configuration as depicted in FIG. 1B, rather, embodiments may be implemented with SSD configurations other than that illustrated in FIG. 1B. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be an operating system executing on a computer, a tablet, a mobile phone, or generally any type of computing device that contains or interacts with memory, such as host 350 (FIG. 3). The primary interface 156 coupling host 154 to SSD 152 may be, for example, a storage system's internal bus or a communication cable or a wireless communication link, or the like.

The example SSD 152 illustrated in FIG. 1B includes an interface 160, a controller 162 (e.g., a controller having firmware logic therein), an addressing 164 function block, data buffer cache 166, and one or more non-volatile memory components 170a, 170b-170n.

Interface 160 is a point of interaction between components, namely SSD 152 and host 154 in this context, and is applicable at the level of both hardware and software. This allows a component to communicate with other components via an input/output (IO) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND flash) to the host, such as non-volatile memory 170a, 170b, 170n to host 154. The controller is typically an embedded processor that executes firmware-level code and is an important factor in SSD performance.

Controller 162 interfaces with non-volatile memory 170a, 170b, 170n via an addressing 164 function block. The addressing 164 function operates, for example, to manage mappings between logical block addresses (LBAs) from the host 154 to a corresponding physical block address on the SSD 152, namely, on the non-volatile memory 170a, 170b, 170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for identifying a problematic hard disk drive (HDD), the method comprising:
retrieving a respective recovery log from each of a plurality of hard disk drives (HDDs);
based on each respective recovery log, determining a value for a Full Recoveries Per Hour (FRPH) metric for each respective read-write head of each respective HDD of the plurality of HDDs, including:
summing an amount of time the head spends on all recovery steps performed by the head over a particular length of time for evaluation, including characterizing a full recovery as corresponding to a pre-determined length of time the head spends on one or more recovery steps,
determining an equivalent number of full recoveries over the particular length of time based on the amount of time summed, and
based on the number of full recoveries determined and the particular length of time, determining the FRPH value for the head; and
in response to a particular head FRPH value reaching a pre-determined FRPH threshold value, determining an in-situ repair for the HDD in which the particular head operates.

2. The method of claim 1, wherein the plurality of HDDs are constituent to a single data storage system.

3. The method of claim 2, further comprising:
determining the FRPH threshold value based on a mean or median value of FRPH for the plurality of HDDs constituent to the single data storage system.

4. The method of claim 1, wherein the plurality of HDDs are constituent to a plurality of data storage systems.

5. The method of claim 4, further comprising:
determining the FRPH threshold value based on a mean or median value of FRPH for the plurality of HDDs constituent to the plurality of data storage systems.

6. The method of claim 1, wherein the particular length of time is a configurable parameter.

7. The method of claim 1, wherein determining the value for FRPH further comprises identifying a problematic HDD as an HDD having one or more heads exhibiting an FRPH value equal to or greater than the FRPH threshold value of one full recovery over a 300-hour time period.

8. The method of claim 1, wherein determining the in-situ repair for the HDD comprises:
identifying the HDD as a problematic HDD based on having one or more heads exhibiting an FRPH value equal to or greater than the FRPH threshold value over the particular length of time;
identifying the head, within the problematic HDD, having the highest FRPH value; and
classifying the head having the highest FRPH value as ineligible for use in further input/output (IO) operations.

9. The method of claim 8, wherein determining the in-situ repair for the HDD comprises:
if no head exhibits an FRPH value equal to or greater than the FRPH threshold value over the particular length of time, then reformatting the HDD to its current storage capacity.

10. The method of claim 1, wherein determining the in-situ repair for the HDD comprises:
identifying one or more troublesome regions of storage media contributing to the FRPH value; and
marking the one or more troublesome regions of storage media unavailable for further input/output (IO) operations.

11. A data storage system comprising:
a plurality of data storage devices; and
a system controller circuitry comprising memory and one or more processors and embodying one or more sequences of instructions which, when executed by the one or more processors, cause performance of:
retrieving a respective recovery log from each of a plurality of hard disk drives (HDDs);
based on each respective recovery log, determining a value for a metric Full Recoveries Per Hour (FRPH) metric for each respective read-write head of each respective HDD of the plurality of HDDs, including:
summing an amount of time the head spends on all recovery steps performed by the head over a particular length of time, including characterizing a full recovery as corresponding to a pre-determined length of time the head spends on one or more recovery steps,
determining an equivalent number of full recoveries over the particular length of time based on the amount of time summed, and
based on the number of full recoveries determined and the particular length of time, determining the FRPH value for the head; and
in response to a particular head FRPH value reaching a pre-determined FRPH threshold value, determining an in-situ repair for the HDD in which the particular head operates.

12. The data storage system of claim 11, wherein the one or more sequences of instructions cause further performance of:
determining the FRPH threshold value based on a mean or median value of FRPH for the plurality of HDDs constituent to the data storage system.

13. The data storage system of claim 11, wherein the one or more sequences of instructions cause further performance of:
determining the FRPH threshold value based on a mean or median value of FRPH for the plurality of HDDs constituent to a plurality of data storage systems.

14. The data storage system of claim 11, wherein determining the in-situ repair for the HDD comprises:
identifying the HDD as a problematic HDD based on having one or more heads exhibiting an FRPH value equal to or greater than the FRPH threshold value over the particular length of time;
identifying the head, within the problematic HDD, having the highest FRPH value; and
classifying the head having the highest FRPH value as ineligible for use in further input/output (IO) operations.

15. The data storage system of claim 14, wherein determining the in-situ repair for the HDD comprises:
if no head exhibits an FRPH value equal to or greater than the FRPH threshold value over the particular length of time, then reformatting the HDD to its current storage capacity.

16. The data storage system of claim 11, wherein determining the in-situ repair for the HDD comprises:
identifying one or more troublesome regions of storage media contributing to the FRPH value; and marking the one or more troublesome regions of storage media unavailable for further input/output (IO) operations.

17. A data storage system comprising:
a plurality of hard disk drives (HDDs);
means for retrieving a respective recovery log from each of the plurality of HDDs;
means for determining, based on each respective recovery log, a value for a metric Full Recoveries Per Hour (FRPH) metric for each respective read-write head of each respective HDD of the plurality of HDDs, including:
  means for summing an amount of time the head spends on all recovery steps performed by the head over a particular length of time, including characterizing a full recovery as corresponding to a pre-determined length of time the head spends on one or more recovery steps,
  means for determining an equivalent number of full recoveries over the particular length of time based on the amount of time summed, and
  means for determining the FRPH value for the head based on the number of full recoveries determined and the particular length of time; and
means for determining, in response to a particular head FRPH value reaching a pre-determined FRPH threshold value, an in-situ repair for the HDD in which the particular head operates.

18. The data storage system of claim 17, wherein the means for determining the in-situ repair for the HDD comprises:
  means for identifying the HDD as a problematic HDD based on having one or more heads exhibiting an FRPH value equal to or greater than the FRPH threshold value over the particular length of time;
  means for identifying the head, within the problematic HDD, having the highest FRPH value; and
  means for classifying the head having the highest FRPH value as ineligible for use in further input/output (IO) operations.

19. The data storage system of claim 18, wherein the means for determining the in-situ repair for the HDD comprises:
  means for reformatting the HDD to its current storage capacity if no head exhibits an FRPH value equal to or greater than the FRPH threshold value over the particular length of time.

20. The data storage system of claim 17, wherein the means for determining the in-situ repair for the HDD comprises:
  means for identifying one or more troublesome regions of storage media contributing to the FRPH value; and
  means for marking the one or more troublesome regions of storage media unavailable for further input/output (IO) operations.

21. A data storage system comprising:
a plurality of solid-state data storage devices (SSDs); and
a system controller circuitry comprising memory and one or more processors and embodying one or more sequences of instructions which, when executed by the one or more processors, cause performance of:
  based on host input/output (IO) request collisions, determining a value for a waiting metric for each respective SSD of the plurality of SSDs, including:
    summing an amount of wait time spent on collisions by the SSD over a particular length of time, including characterizing a full wait as corresponding to a pre-determined length of time the SSD spends resolving collisions,
    determining an equivalent number of full waits over the particular length of time based on the amount of wait time summed, and
    based on the number of full waits determined and the particular length of time, determining the waiting metric value for the SSD; and
  in response to a particular SSD waiting metric value reaching a pre-determined threshold value, determining an in-situ repair for the SSD.

* * * * *